United States Patent [19]
Wakabayashi et al.

[11] Patent Number: 5,727,327
[45] Date of Patent: Mar. 17, 1998

[54] CENTERING METHOD AND APPARATUS

[75] Inventors: Ryosaku Wakabayashi; Yoshihiro Takase, both of Toyama; Kazuo Okazaki, Urawa; Yoshifumi Fujii, Toyama, all of Japan

[73] Assignee: Kabushiki Kaisha Fujikoshi, Toyama, Japan

[21] Appl. No.: 631,983

[22] Filed: Apr. 15, 1996

[30] Foreign Application Priority Data

Apr. 13, 1995 [JP] Japan .................................. 7-111111
Apr. 13, 1995 [JP] Japan .................................. 7-111112

[51] Int. Cl.$^6$ .................................................. G01B 5/12
[52] U.S. Cl. .......................... 33/520; 33/542; 33/544
[58] Field of Search .......................... 33/188, 701, 783, 33/806, 520, 644, 542, 544, 544.2, 544.3, 555.1

[56] References Cited

U.S. PATENT DOCUMENTS

| | | | |
|---|---|---|---|
| 4,521,968 | 6/1985 | Wiltermood et al. | 33/542 |
| 4,571,848 | 2/1986 | Krutz et al. | 33/544 |
| 4,627,170 | 12/1986 | McKechnie | 33/544 |
| 4,821,425 | 4/1989 | Currie et al. | 33/520 |

FOREIGN PATENT DOCUMENTS 272602  12/1986  Japan .................................. 33/542

*Primary Examiner*—Thomas B. Will
*Attorney, Agent, or Firm*—Spencer & Frank

[57] ABSTRACT

A centering apparatus and method is provided which automatically measuring the radius or radius deviation of a large cylindrical bore, and shorten the time required for centering. The inspection apparatus is supported on a rise and fall base which is horizontally supported on a top portion of the large cylindrical bore in such a manner that it is allowed to vertically move in parallel with a fine wire which is hung perpendicularly from the center of the top portion. The inspection apparatus having a non-contact type two-dimensional position sensor for detecting the relative position of the fine wire to the cent-er of the inspection apparatus. The inspection apparatus is positioned at an arbitrary height. A pair of manipulator arms, which are in stalled on the inspection apparatus, which are substantially symmetrically balanced in gravity, are extended to a point immediately before an object to be measured, then a pair slider units mounted on the tip of one of the manipulator arms are extended until they come in contact with a object to be measured of the inner surface of the large cylindrical bore. Then the distance between the object to be measured and the reference position of the tip of one of the slider units is measured by a distance measuring device attached on the one of the slider units, or is measured by it after the vibration of the manipulator arms is isolated by contact members attached to the slider units, thereby the radius or radius deviation of the large cylindrical bore is measured.

24 Claims, 5 Drawing Sheets

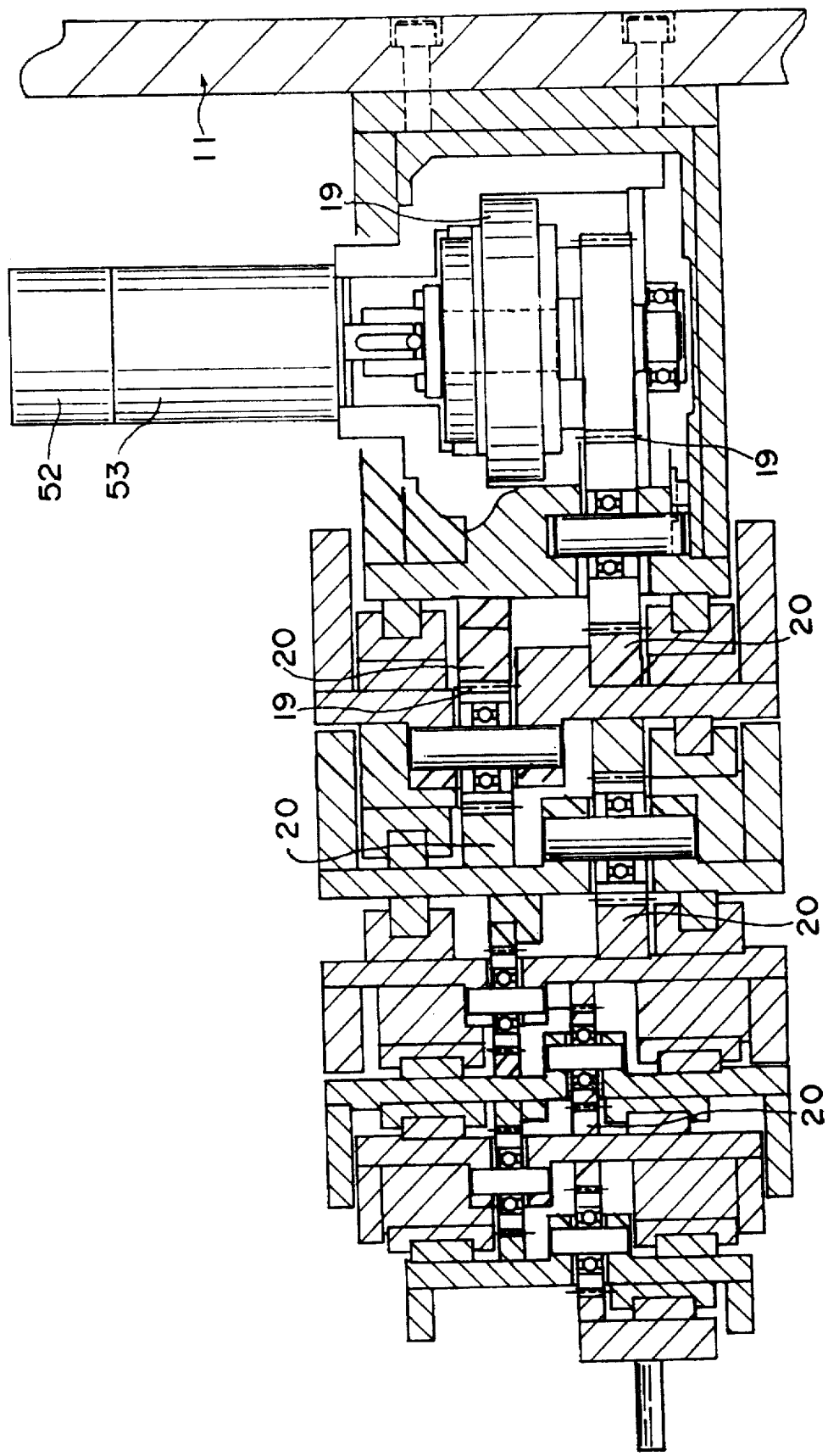

CENTERING METHOD AND APPARATUS

BACKGROUND OF THE INVENTION

1. Field of the Invention

The present invention relates to a centering method and apparatus for centering a turbine rotor of a hydro-electric power generator or the like and, more particularly, to a centering method and approximately for measuring a plurality of varying inner surface radii of a large cylindrical bore of a stator of a large rotary machine, which has a radius ranging from approximately 40 centimeters to approximately 5 meters, with accuracy of 5 to 10 μm.

2. Description of the Related Art

FIG. 5 shows a conventional centering apparatus used for the purpose described above. Hitherto, a piano wire 2 with a weight 7 attached to the tip thereof was hung from the center of a head base assembly 1 which was supposed by a top portion 10 of a large cylindrical bore of the stator of a large rotary machine such as a hydro-electric power generator. A scaffold (not shown), for an inspection point was fabricated and an inspector on the scaffold applied an inside micrometer 4, which served as an inspection bar, to a surface 3 to be measured and to the piano wire 2. The inspector listened, through a receiver 5, to an electric sound which is head when the inside micrometer 4 contacts with the piano wire 2 and then the inspector reads the value indicated on the inside micrometer, thereby performing the inspection with the accuracy in the order of 5 to 10 μm. Reference numeral 6 denotes a battery and reference numeral 8 denotes a container holding oil 9 therein.

The conventional method for measuring a bore diameter, however, requires the accuracy of 5 to 10 μm; therefore, the inspection was extremely difficult and had to depend on a highly skilled engineer. In addition, careful attention had to be paid in order to make no mistake in reading the inside micrometer 4 or to check the elongation of the holder 4' of the inside micrometer 4 caused by the conduction of the inspector's body heat in order to secure reliability for the measuring. There were another shortcomings in such conventional method that so many days such as three weeks or so were required in the centering a turbine rotor of a hydro-electric power generator or the like, resulting many man-hours being required, a considerable loss caused by the stopping of the power generator for the inspection, and careful safety guards must be furnished for the inspector working on high scaffolds.

SUMMARY OF THE INVENTION

Accordingly, it is an object of the present invention to provide a centering method and apparatus which solves the above problems caused by the prior art described above, and which automatically measures the radius or radius deviation of a large cylindrical bore, and is capable of shortening a required time for inspection, eliminating a considerable loss caused by stopping of a hydro-electric power generator for the inspection, eliminating the need for safety guards for the inspector working on high scaffolds, and achieving improved reliability for the inspection.

To this end, in accordance with one aspect of the present invention, the problems with the prior art stated above have been solved by providing a centering method and apparatus wherein; supporting an inspection apparatus on a rise and fall base which is horizontally supported by a head base assembly supported by a top portion of a large cylindrical bore in such a manner that it is allowed to vertically move in parallel to a fine wire which is hung perpendicularly from the center of the top portion of the large cylindrical bore, and the inspection apparatus having a non-contact type two-dimensional position sensor for detecting the relative position of the fine wire to the center of the inspection apparatus; positioning the inspection apparatus at an arbitrary height; extending a pair of manipulator arms installed on the inspection apparatus to a point immediately before an inner surface of the cylindrical bore to be measured and positioning it at the point, the pair of manipulator arms being able to be extended or contracted and symmetrically balanced in gravity in a lateral direction; extending a pair of slider units attached to the tips of each of said pair of manipulator arms and capable of being extended or contracted in a lateral direction by a predetermined distance to a point immediately before the leading tip thereof comes in contact with a object to be measured of the inner surface of the cylindrical bore and the slider units are positioned at the point; measuring a distance between a reference position of the tip of the slider unit and the inner surface of the cylindrical bore by using a distance measuring device mounted on the tip of one of the slider units; measuring a relative position of the fine wire to the center of the inspection apparatus using the non-contact type two-dimensional position sensor; and determining a radius or a radius deviation of the object to be measured from the relative position of the fine wire to the center of the inspection apparatus, the length from the position of the center to a reference position of the tip of the slider unit provided with the distance measuring device, and the measured value of a distance between the tip reference position and the object to be measured of the inner surface of the cylindrical bore, which distance is detected by the distance measuring device, all of which are obtained at each of the positioning points.

According to another aspect of the present invention, the problems with the prior art stated above have been solved by providing a centering method and apparatus wherein: supporting an inspection apparatus on a rise and fall base which is horizontally supported by a head base assembly supported by a top portion of a large cylindrical bore in such a manner that it is allowed to vertically move in parallel to a fine wire which is hung perpendicularly from the center of the top portion of the large cylindrical bore, and the inspection apparatus having a non-contact type two-dimensional position sensor for detecting the relative position of the fine wire to the center of the inspection apparatus; positioning the inspection apparatus at an arbitrary height; extending a pair of manipulator arms installed on the inspection apparatus to a point immediately before an inner surface of said cylindrical bore to be measured and they are positioned at the point, the pair of manipulator arms being able to be extended or contracted and symmetrically balanced in gravity in a lateral direction; extending a first slider unit which is fixed on the tip of one of the manipulator arms and capable of being extended or contracted in a lateral direction by a predetermined distance to a point where a vibration isolation contact member attached to the tip of the first slider unit comes in contact with the inner surface of the cylindrical bore and the first slider unit is positioned at that point; extending a second slider unit which is fixed on the tip of the other manipulator arm and capable of being extended or contracted in a lateral direction by a predetermined distance to a point where a vibration isolation contact member attached to the tip of the second slider unit comes in contact with the inner surface of the cylindrical bore and the second slider unit is positioned at that point; extending, with the respective contact members in contact with the inner surface of the large cylindrical bore, an extensible tip capable of being positioned at an arbitrary point and mounted on a contact type extensible measuring probe attached to the tip of the second slider unit beside the vibration isolation contact member until it comes in contact with the object to be measured, namely, the inner surface of the cylindrical bore, and the extensible tip is positioned at that point; detecting the relative position of the fine wire relative to the center of said inspection apparatus being mounted on a rise and fall base using a non-contact type two-dimensional position sensor supported on said inspection apparatus; and determining a radius or a radius deviation of the object to be measured from the data of said non-contact type two-dimensional position sensor measured the relative position of the center of the inspection apparatus in relation to the fine wire, the distance from the position of the center to the tip reference position of the slider unit provided with the contact type extensible measuring probe, and the measured value of the distance from said tip reference position to the object to be measured which is given by the extensible tip of said contact type extensible measuring probe, all of which are obtained at the positioning points.

By such an arrangement, the radius or radius deviation of the inner surface of an object to be measured can be automatically measured. Thus, there is provided a centering method and apparatus which is possible to shorten the term for centering a turbine rotor of a hydro-electric power generator or the like by about one week, to reduce the man-hours for the centering to approximately two thirds, to reduce the loss caused by stopping the power generator for the inspection, to eliminate the need for safety guards for the inspector working on high scaffolds, and to achieve higher reliability for the inspection.

Preferably, the radius and radius deviation of the object to be measured are calculated by entering the data of the non-contact type two-dimensional position sensor, the data of the encoders of the respective manipulator arms, the data of the encoders of the first and second slider units, and the data detected by the contact type extensible measuring probe to a computer which adds a deviation correction value obtained by converting the data of the non-contact type two-dimensional position sensor into the amount of deviation of the center of the inspection apparatus in relation to the fine wire, the value of the distance to the reference point of the tip of the manipulator arm obtained by converting and adding the data of the respective encoders of the respective manipulator arms to calculate the distance between the reference points of the tips of the manipulator arms and the center of the inspection apparatus when the manipulator arms are extended, the value of the extension length of the first and second slider units obtained by converting the data of the respective encoders of the first and second slider units to give the distance between the manipulator arm tip reference points and the first and second slider unit tip reference points, and the value of the extension length of the contact type extensible measuring probe tip obtained by converting the data detected by the contact type extensible measuring probe, i.e. a measuring device, to give the distance between the point of the tip of the contact type extensible measuring probe and the first and second slider unit tip reference points. Hence, the centering can be performed automatically by remote automatic control.

Further preferably, the computer and a console thereof, a manual pulse generator, and a control unit should be located adjacently to the top portion of the large cylindrical bore so that a control pulse from the manual pulse generator, the data of the non-contact type two-dimensional position sensor, and the data of the respective encoders are transmitted through coupling cables. This makes it possible to carry out the centering operation by automatic control from the same floor where the top portion of the large cylindrical bore is located, permitting safer automatic inspection. The use of a machine vision apparatus installed on the inspection apparatus to detect the contact between the tip of the contact type extensible measuring probe and the object to be measured will further automate the inspection. Moreover, receiving and sending a part of all the control pulses of the manual pulse generator, the data of the non-contact type two-dimensional position sensor, and the data of the respective encoders by radio transmission will still further automate the inspection.

BRIEF DESCRIPTION OF THE DRAWINGS

FIG. 3 is an enlarged side view of a driving assembly of the manipulator arms of FIG. 1(a), a part thereof being cut away;

DETAILED DESCRIPTION OF THE PREFERRED EMBODIMENTS

Figure 1A:
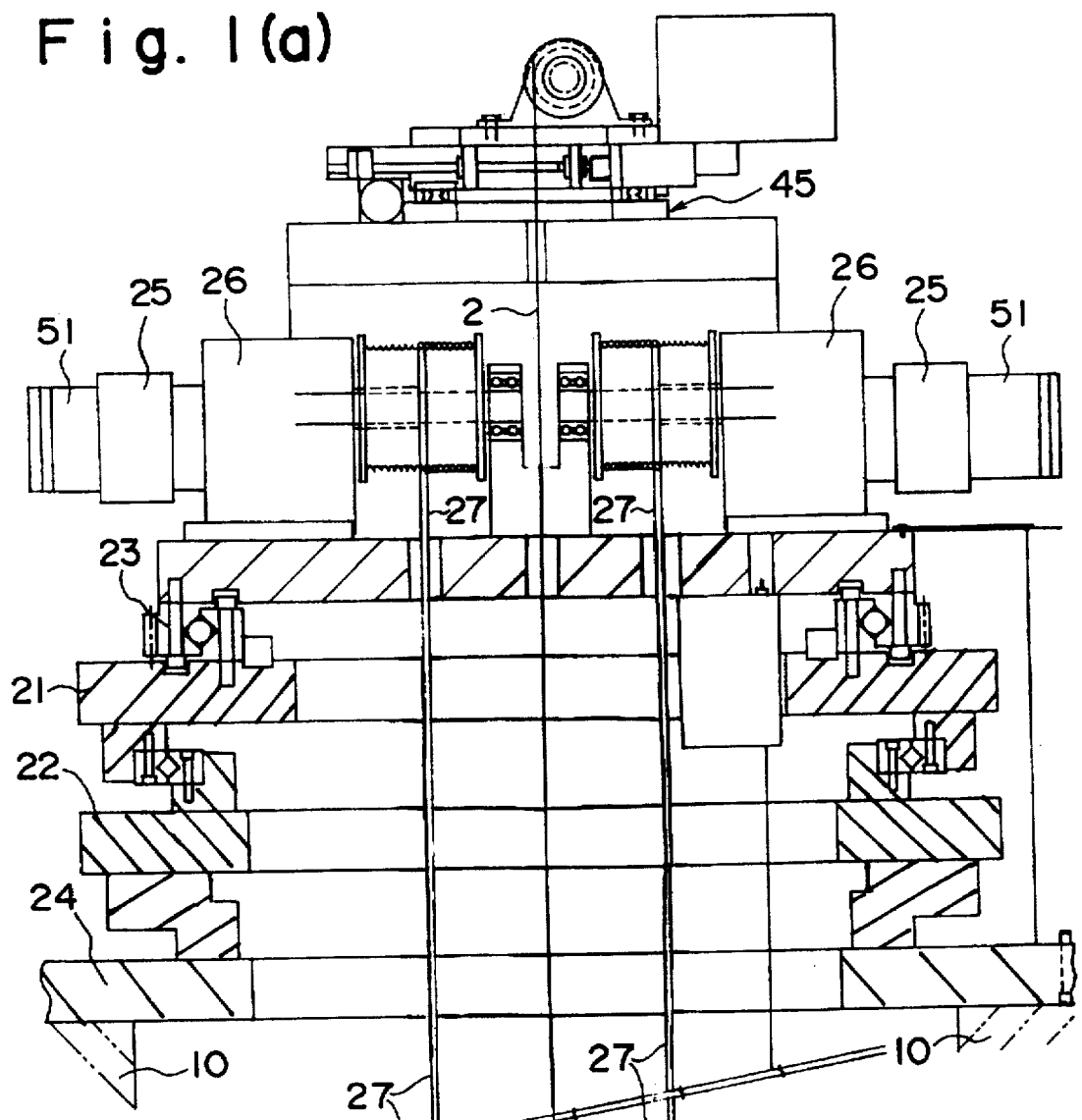
FIG. 1(a) is a general elevational view showing a centering apparatus which is an embodiment according to one aspect of the present invention, a part thereof being cut away, wherein manipulator arms have been contracted.
Figure 1B:
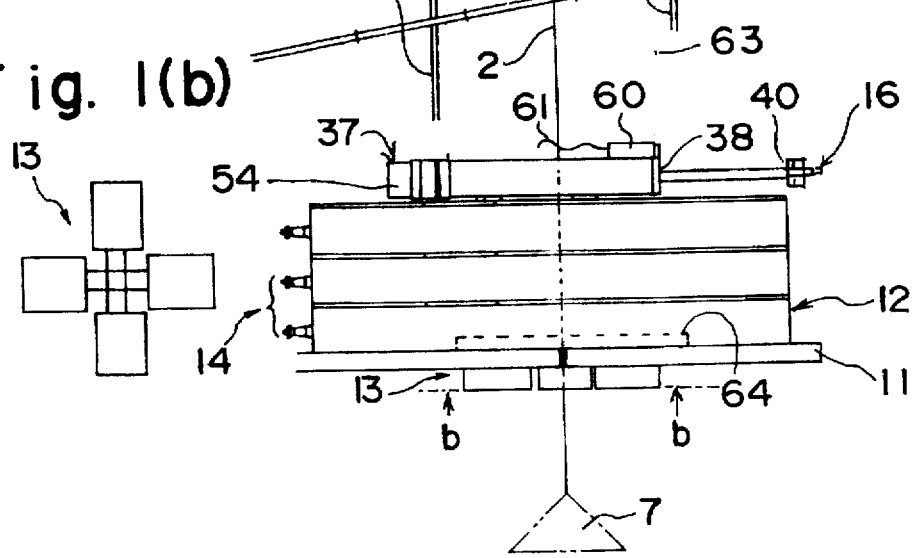
FIG. 1(b) is a cross-sectional view taken along line b—b of FIG. 1(a)
Figure 2A:
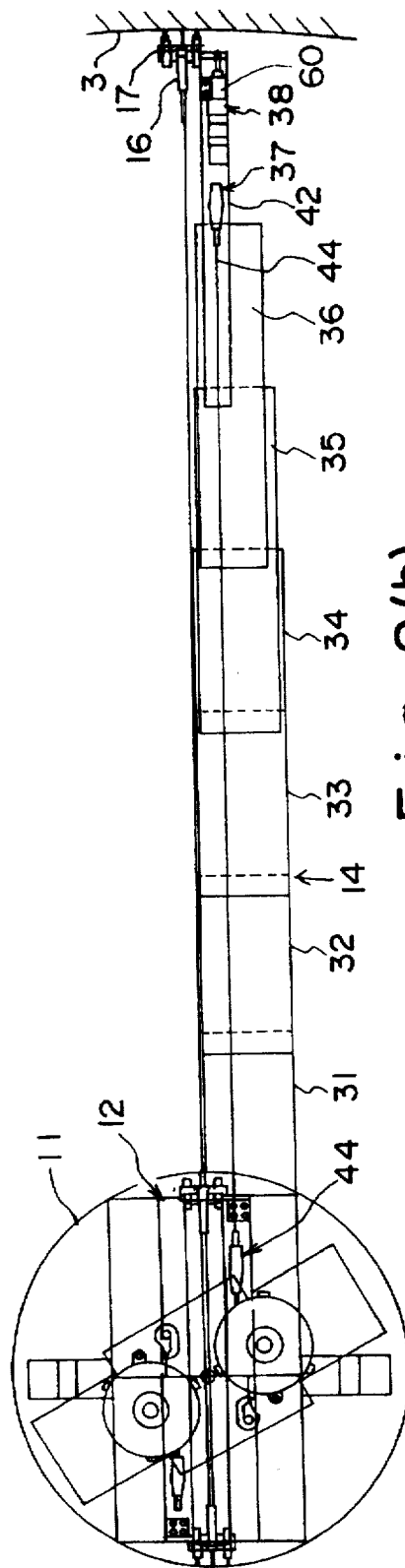
FIG. 2(a) is a general plan view wherein one of the manipulator arms of FIG. 1(a) has been extended and the other manipulator arm has been omitted for the convenience of explanation.
Figure 2B:
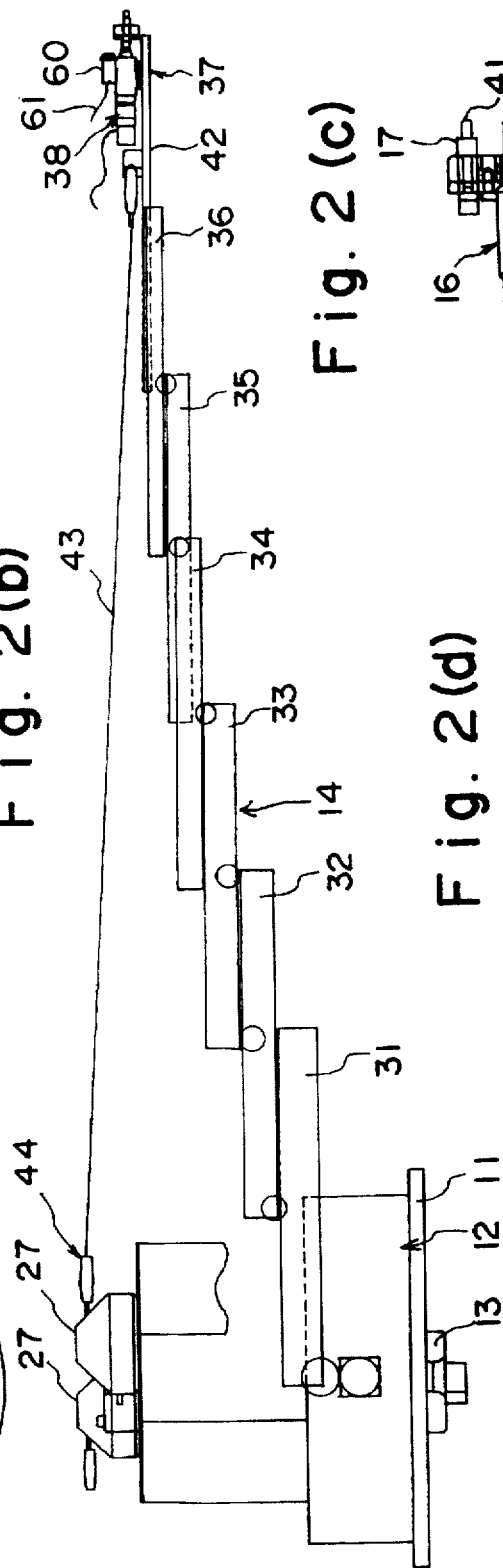
FIG. 2(b) is a general side view of FIG. 2(a)
Figure 2C:
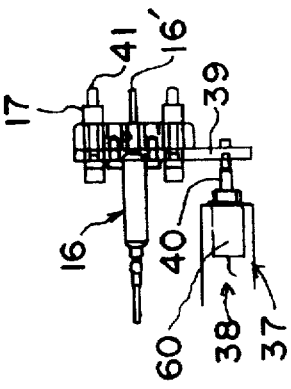
FIG. 2(c) is a partially enlarged view showing a contact member and a contact type extensible measuring probe of FIG. 2(a)

The present invention will be described in detail with reference to the accompanying drawings. Referring to FIG. 1(a), which is a general elevational view showing the structure of a centering apparatus which is an embodiment of a first aspect of the present invention with a part thereof cut away and which shows manipulator arms in a contracted condition, and FIG. 1(b), the centering apparatus according to the present invention has an inspection apparatus 12 mounted on a rise and fall base 11 which is horizontally supported so that it is allowed to vertically move in parallel with a piano wire 2 hung perpendicularly from the center of a top portion 10 of a large cylindrical bore. The rise and fall base 11 is positioned at an arbitrary height. The inspection apparatus 12 has, at the center thereof, a two-dimensional laser position sensor, which is a non-contact type two-dimensional position sensor 13, for surrounding the piano wire 2 to detect the position of the piano wire 2 relative to the center of the inspection apparatus 12 mounted on a rise and fall base 11. As illustrated in FIG. 2(a), FIG. 2(b) and FIG. 2(c), the inspection apparatus 12 has a pair of manipulator arms 14 each of which is constructed by a plurality of stages of highly rigid slide arms 31 through 36. The manipulator arms 14 of the inspection apparatus 12 can be extended or contracted in the lateral direction so that the tip or the outermost slide arm 36 can be positioned at an arbitrary extended point and which are symmetrically balanced by gravity. A second slider unit 37 attached to the slide arm 36 of the tip of one of the manipulator arms 14 can be extended and contracted in a lateral direction so as to be positioned at an arbitrary extension point; and both a vibration isolation contact member 17 with a top composed of an elastic member and a contact type extensible measuring probe 16 having an extensible tip 16' being able to be extended or contracted in the lateral direction so as to be positioned at an arbitrary extended point, are mounted in array on the tip of the second slider unit 37. A first slider unit which is not shown and which can be extended or contracted in a lateral direction in a similar manner as the second slider unit 37 is attached to the other tip (not shown in FIG. 2) of the manipulator arm 14; and a contact member which is not shown and which is similar to the contact member 17 shown in FIG. 2(c) is fixed to the tip of the first slider unit. The non-contact type two-dimensional position sensor 13 may not necessarily be the two-dimensional laser position sensor. Further, instead of the contact type extensible measuring probe 16, a distance measuring device or a non-contact type laser distance measuring device, which are not shown, may be attached to the tip of the second slider unit 37.

In operation, the inspection apparatus 12, wherein the non-contact type two-dimensional position sensor 13 for detecting the position of the fine wire is supported horizontally, is positioned at a desired or an arbitrary point which is parallel to the piano wire 2. The pair of manipulator arm 14 attached to the inspection apparatus 12 are extended to a point immediately before the object 3 to be measured (FIG. 2), namely, the inner surface of the large cylindrical bore to be measured and it is positioned at that point. Then, the first slider (not shown) attached to the tip of one of the manipulator arms 14 is extended by a predetermined distance until the vibration isolation contact member, which is attached to the tip, comes in contact with the inner surface of the large cylindrical bore on the opposite side which is not shown (the design distance from the piano wire 2 to the object 3 to be measured, namely the inner surface of the large cylindrical bore, is known) and the manipulator arms 14, the first slider and the vibration isolation contact member are positioned at that point. The second slider unit 37 attached to the tip of the other manipulator arm 14, to which the vibration isolation contact member 17 and the contact type extensible measuring probe 16 are fixed in array, is extended until the contact member 17 comes in contact with the object 3 to be measured, namely, the inner surface of the large cylindrical bore, and the manipulator arms 14, the first slider and the vibration isolation contact member are positioned at that point. With the respective contact members 17 in contact with the inner surface of the large cylindrical bore, the tip 16' of the measuring probe 16 attached to the tip of the second slider unit 37 is brought in contact with the object 3 to be measured, namely, the inner surface of the large cylindrical bore and is positioned at that point. Thus, the radius or the radius deviation of the object 3 to be measured can be automatically measured without human aid from the position of the center of the inspection apparatus 12 of the rise and fall base in relation to the piano wire 2 which is detected by the non-contact type two-dimensional position sensor 13, the distance from the position of the center to the tip reference position of the second slider unit 37 with the contact type extensible measuring probe 16, the measured value of the distance between the tip reference position detected by the contact type extensible measuring probe 16 and the object 3 to be measured, which are all obtained at the aforesaid positioning points. This enables the centering apparatus to shorten the term for centering a turbine rotor of a hydro-electric power generator or the like by about one week, reduce the man-hours to approximately two thirds, reduce the loss caused by stopping the power generator for the inspection, eliminate the need for safety guards for the inspector working on high scaffolds to improve safety, and achieve higher reliability for the inspection.

Figure 2D:
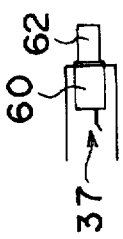
FIG. 2(d) is a partially enlarged view of a portion corresponding to FIG. 2(c) of a centering apparatus which is an embodiment according to another aspect of the present invention and it shows only portions which are different from those of FIGS. 1(a) and (b) and FIGS. 2(a), (b), and (c)

If a distance measuring device 62 or the non-contact type laser distance measuring device of the type for example such as shown in FIG. 2(d) is attached, in place of the contact type extensible measuring probe 16, to the tip of the second slider unit 37, and when the vibration isolation contact member 17 attached to the tip of the second slider unit 37 comes in contact with the object 3 to be measured, namely, the inner surface of the large cylindrical bore, and the tip of the second slider unit 37 is positioned at that point, the distance measuring device 62 is allowed to perform measurement or a plurality of times of measurement of the distance between the aforesaid tip reference position and the object 3 to be measured, namely, the inner surface of the large cylindrical bore, so as to determine the distance deviation.

As shown in FIG. 2(d) which is a partially enlarged view of a portion corresponding to FIG. 2(c) of a centering apparatus which is an embodiment according to another aspect of the present invention and it shows only portions which are different from those of FIGS. 1(a) and and FIGS. 2(a), (b), and (c), and the centering apparatus according to this aspect of the present invention has similar arrangement to that of shown in FIGS. 2(a) and (b), the tips of the pair of manipulator arms 14 of FIG. 2(a) are provided with slider units 37 which are extensible and which can be positioned at a desired extension point, is provided with a distance measuring device 62 or the non-contact type laser distance measuring device rather than the contact member.

According to this embodiment, in operation, the radius of the object 3 to be measured is measured without having the tips of the first and second slider units 37 come in contact with the inner surface of the large cylindrical bore. The radius deviation can be determined by carrying out a plurality of numbers of measurement. The rest of the structure and the operation is the same as the structure and operation of FIGS. 1(a) and (b) and FIGS. 2(a) and (b).

In the embodiment shown in FIG. 1, the rise and fall base 11 is hung, via a device which is not shown, with wire ropes 27, 27 by a pair of hoisting winches 26, 26 which have motors 25, 25 with encoders/brakes 51 on a head base assembly 24 and which are rested on numerically controlled first two-axis feed tables 21 and 22 and a numerically controlled turn table 23. The rise and fall base 11 and the inspection apparatus 1 2 are capable of measuring the radius or radius deviation of the object 3 to be measured, namely, the inner surface of the large cylindrical bore, at appropriate dividing points, e.g. at eight dividing points. The manipulator arms 14 of the inspection apparatus 12 is constructed by a plurality of stages of highly rigid slide arms 31 through 36 which have pinions 19 racks 20 driven by a motor 18 equipped with an encoder/reduction gear which is a length measuring device (FIG. 3). The first and second slider units 37 are constituted by a cylinder 38 which is slowly fed by an encoder/ball screw which constitutes a length measuring device.

Thus, the respective tips can be positioned with extremely high accuracy. The first two-axis feed tables 21 and 22 and the turn table 2 3 may be manually controlled (not shown) rather than numerically controlled; the winches 26, 26 may not be provided with the encoders/brakes; and the encoders for the manipulator arms 14 may be linear encoders (not shown) similar to that of shown in FIG. 2(d).

The inspection apparatus 12 of FIGS. 2(a), (b), and (c)(but not of FIG. 2(d)) is equipped with a balancer 44 with a tension spring which has a balancing wire 43, one end of which is connected to nearly central top portions 27, 27 of the inspection apparatus 12 and the other end of which is connected to a supporting portion 42 of the cylinder 38 of the first and second slider units 37. The contact type extensible measuring probe 16 fixed to the tip of the cylinder 38 is extended to a point which is about a few millimeters to about 300 millimeters before the object 3 to be measured; in order to accomplish accurate positioning, the balancer 44 with the tension spring applies tension to the balancing wire 43 and the slide arms 31 through 36 and the first and second slider units 37 are fixed under the tension. The contact member 17 is attached to a mounting flange 39 on a rod tip 40 of the cylinder 38 supported by the first and second slider units 37 and the contact member 17 has a tip 41 composed of an elastic member on the outer side; the contact member 17 is a vibration isolation member which serves as a cushion so that when the tip 41 of the contact member 17 comes in contact with the object 3 to be measured, namely, the inner surface of the large cylindrical bore, the tip 41 is moved back by the cushion. After the slide arms 31 through 36 and the first and second slider units 37 are fixed in place under the tension applied by the balancing wire 43 of the balancer 44 with the tension spring, the rod tip 40 of the cylinder 38 of each slider unit is further extended until the flexible tips 41 of both contact members 17 come in contact with the object 3 to be measured. This stops the vibration of the slide arms 31 through 36 and the first and second slider units 37. Then the radius or radius deviation of the object 3 to be measured is measured in the following manner. The embodiment shown in FIG. 2(d) is not provided with the balancer 44 with the tension spring which has the balancing wire 43.

The tip 16' of the contact type measuring probe 16 is extensible outward and it is installed on the flange 39 in parallel to the contact members 17. The cylinder 38 is slowly fed and the respective contact members 17 reach the inner surface of the large cylindrical bore to stop the vibration of the slide arms 31 through 36 and the first and second slider units 37. Then, the tip 16' of the contact type measuring probe 16 is further extended at an extremely low speed to bring the tip 16' in contact with the object 3 to be measured. After completion of the measurement, the tip 16' of the contact type measuring probe 16 is drawn back to the original position thereof; and the numerically controlled turn table 23 is turned to position it to the next measurement point of the eight points on the circumference which has been divided in to eight arcs. After the same measurement has been performed on all the eight points, the inspection apparatus 12 is moved up or down to go to the next measurement plane. The piano wire 2 is supported via the second two-axis feed table 45 which is supported by the top portion 10 of the large cylindrical bore and numerically controlled independently from the first two-axis feed tables 21 and 22. This makes it possible to automatically hang the piano wire 2 through the center of the top portion 10 of the large cylindrical bore by operating the second two-axis feed table 45, thus eliminating the need of human aid as required in the conventional apparatus.

The radius or radius deviation of the object 3 to be measured is calculated from the data of the non-contact type two-dimensional position sensor 13 for measuring the position of the center of the inspection apparatus 12 in relation to the piano wire 2, the data of the encoders 52 and 53 of the manipulator arms 14 constituted by a plurality of stages of highly rigid slide arms 31 through 36 which have pinions 19 and racks 20 driven by the motor equipped with the encoders and the reduction gear, the data of the encoders 54 and 55 of the first and second slider units 37 constituted by the cylinder which is slowly fed by the encoder/ball screw, and the data detected by the contact type extensible measuring probe 16. The respective slide arms 31 through 36 and the first and second slider unit 37, and the contact type extensible measuring probe 1 6 are designed to enable highly accurate measurement for the centering.

In the method according to the present invention employed for the apparatus shown in FIG. 1, the data of the non-contact type two-dimensional position sensor 13, the data of the encoders 52 and 53 which are the length measuring devices of the manipulator arms 14, the data of the encoders 54 and 55 which are the length measuring devices of the first and second slider units 37, and the data detected by the contact type extensible measuring probe 16 are all entered in a computer 56. The computer 56 calculates; a deviation correction value by converting the data of the non-contact type two-dimensional position sensor 13 into the amount of deviation of the center of the inspection apparatus 12 in relation to the piano wire 2, the value of the tip reference point length of the manipulator arm calculated as the distance between the tip reference points of the manipulator arms 14 and the center of the inspection apparatus 12 when the manipulator arms 14 are extended which is obtained by converting and adding the data of the respective encoders 52 and 53 which are the length measuring devices of the respective manipulator arms 14, the value of the extension length of the first and second slider units obtained by converting the data of the respective encoders 54 and 55 which are the length measuring devices of the first and second slider units 37 to give the distance between the manipulator arm tip reference points and the tip reference points of the first and second slider units 37; and the value of the extension length of the tip 16' of the contact type extensible measuring probe obtained by converting the data detected by the contact type extensible measuring probe 16 to give the distance between the point of the tip of the contact type extensible measuring probe and the first and second slider unit tip reference points. The radius or radius deviation of the object 3 to be measured are obtained by adding the calculated values given above. Hence, the centering can be performed automatically by remote automatic control.

Figure 4:
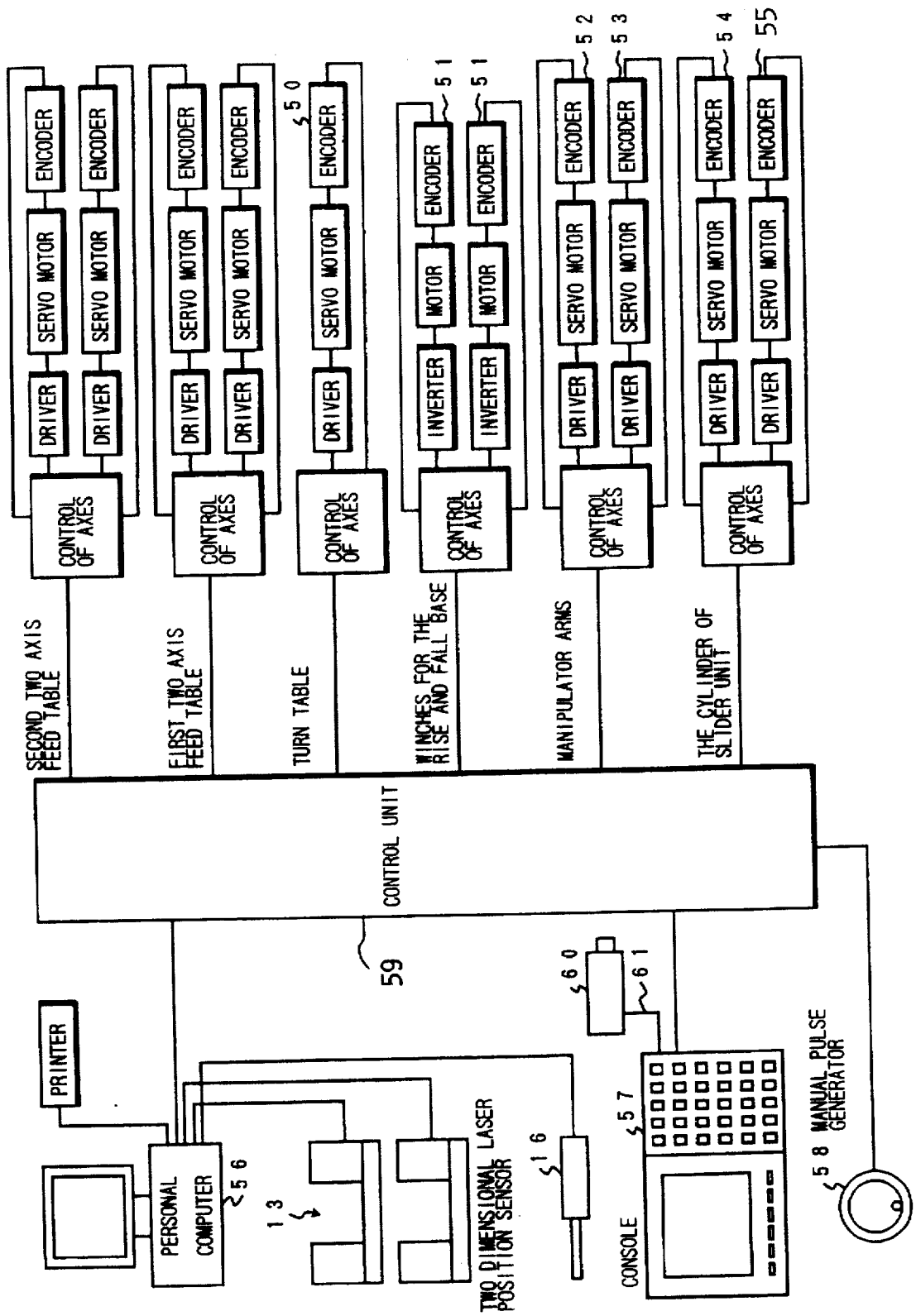
FIG. 4 is a block view of a control system of the centering apparatus of FIG. 1(a)
Figure 5:
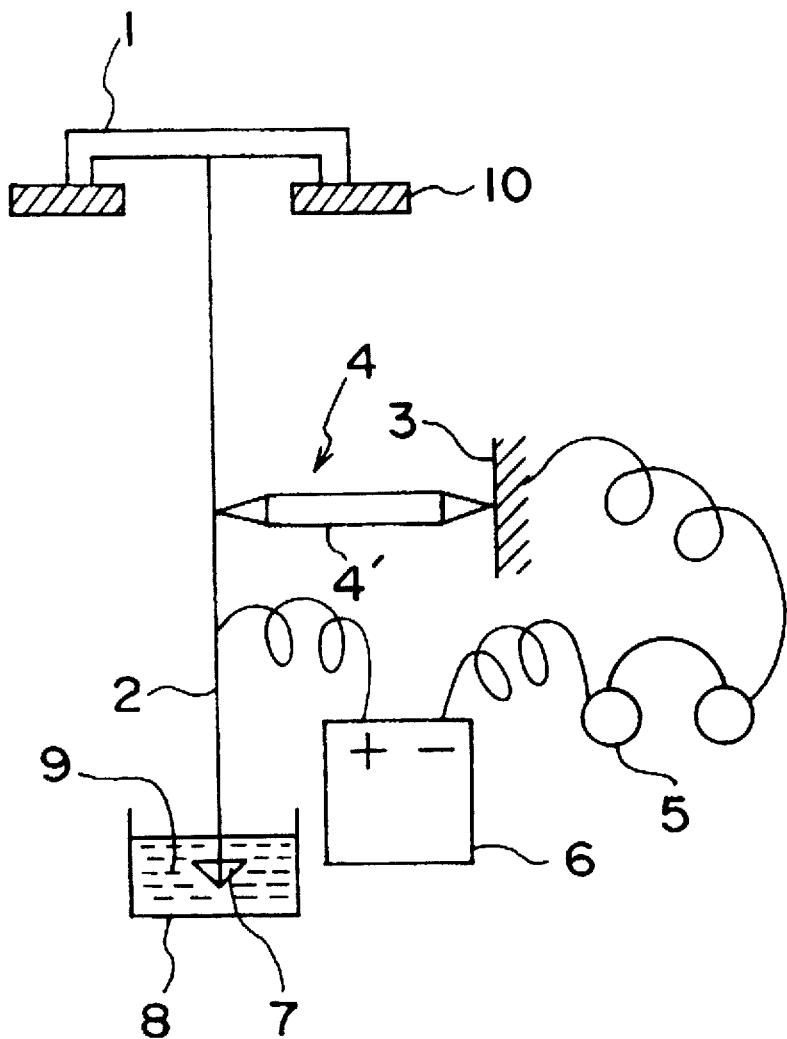
FIG. 5 is a general block view of a conventional centering apparatus.

The computer 56, a console 57, a manual pulse generator 58, and a control unit 59 are located adjacently to the top portion 10 of the large cylindrical bore. The control pulses of the manual pulse generator 58, the data of the non-contact type two-dimensional position sensor 13, and the data of the respective encoders 50 through 55 are transmitted through coupling cables(FIG. 4). Hence, the centering method according to the present invention permits automatic inspection by automatic control performed on the same floor level as that of the top portion 10 of the large cylindrical bore, thus enabling safer automatic inspection to be accomplished. The automation of the inspection can be further enhanced by detecting the contact between the tip 16' of the contact type extensible measuring probe and the object 3 to be measured by using a TV camera 60 with a light projector serving as the machine vision apparatus which is installed on the inspection apparatus 12, preferably on the second slider unit 37. An optical fiber cable 61 is connected to the console 57. The component sections stated above are controlled through a control unit (not shown) installed on the console 57. Preferably, a part or all the control pulses of the manual pulse generator, the data of the non-contacttype two-dimensional position sensor, and the dam of the respective encoders are received and sent by radio transmission so as to further automate the inspection. The inspection apparatus 12 supported by the rise and fall base 11 may alternatively be levelled by adjusting the lengths of a pair of levelling wires 63 indicated by the dashed lines in FIG. 1(a) or by measuring the levelness of the inspection apparatus by using a slant sensor 64 which is installed on the inspection apparatus 12 and which is indicated by the dashed line in FIG. 1(a).

What is claimed is:

1. A centering apparatus comprising an inspection apparatus mounted on a rise and fall base supported on a head base assembly supported by a top portion of a large cylindrical bore, the inspection apparatus being horizontally supported in such a manner that it is allowed to vertically move in parallel to a fine wire and which can be positioned at an arbitrary height, and, the fine wire being hung perpendicularly from the center of a top portion of a large cylindrical bore; further, said inspection apparatus comprising a non-contact type two-dimensional position sensor which surrounds said fine wire at the center thereof to detect the relative position of said fine wire to the center of said inspection apparatus installed on said rise and fall base, a pair of extensible manipulator arms which can be positioned at an arbitrary extension or contraction point and which are almost symmetrically balanced in gravity in a lateral direction, a pair of extensible slider units which are mounted on the tips of said manipulator arms and which can be positioned at an arbitrary extension or contraction point, and a distance measuring device which is fixed on the tip of one of said slider units.

2. A centering apparatus according to claim 1, wherein the tips of said pair of slider units are provided with a vibration isolation contact member with an elastic member and said distance measuring device is a contact type extensible measuring probe which can be positioned at an arbitrary extension or contraction point and which is disposed beside the contact member.

3. A centering apparatus according to claim 1, wherein said distance measuring device is a non-contact type two-dimensional laser position sensor, said rise and fall base is hung with a wire rope by a pair of hoisting winches on a first two-axis feed table and a turn table both rested on the head base assembly which are supported by said top portion of said large cylindrical bore, said respective manipulator arms are constituted by a plurality of stages of highly rigid slide arms which have a rack/pinion assembly, and said respective slider units are composed of a cylinder which is able to be fed slowly.

4. A centering apparatus according to claim 2, wherein said inspection apparatus further comprises a balancer with a tension spring which has a balancing wire, one end of which is connected to an approximately top center of said inspection apparatus and the other end of which is connected to said respective slider units.

5. A centering apparatus according to claim 1, wherein said fine wire is supported via a second two-axis feed table which is supported by said top portion of said large cylindrical bore independently of said first two-axis feed table.

6. A centering apparatus according to claim 2, wherein said distance measuring device is a non-contact type two-dimensional laser position sensor, said rise and fall base is hung with a wire rope by a pair of hoisting winches on a first two-axis feed table and a turn table both rested on the head base assembly which are supported by said top portion of said large cylindrical bore, said respective manipulator arms are constituted by a plurality of stages of highly rigid slide arms which have a rack/pinion assembly, and said respective slider units are composed of a cylinder which is able to be fed slowly.

7. A centering apparatus according to claim 2, wherein said fine wire is supported via a second two-axis feed table which is supported by said top portion of said large cylindrical bore independently of said first two-axis feed table.

8. A centering method wherein;

supporting an inspection apparatus mounted on a rise and fall base which is horizontally supported by a head base assembly supported by a top portion of a large cylindrical bore in such a manner that it is allowed to vertically move in parallel to a fine wire which is hung perpendicularly from the center of said top portion of said large cylindrical bore, and said inspection apparatus having a non-contact type two-dimensional position sensor for detecting the relative position of said fine wire to the center of said inspection apparatus;

positioning said inspection apparatus at an arbitrary height;

extending a pair of manipulator arms installed on said inspection apparatus to a point immediately before an inner surface of said cylindrical bore to be measured and they are positioned at the point, said pair of manipulator arms being able to be extended or contracted in a lateral direction and symmetrically balanced in gravity;

extending a pair of slider units attached to the tips of each of said pair of manipulator arms and capable of being extended or contracted in a lateral direction by a predetermined distance to a point immediately before the leading tip thereof comes in contact with the inner surface of said cylindrical bore and said slider units are positioned at the point;

measuring a distance between a reference position of the tip of said slider unit and the inner surface of said cylindrical bore by using a distance measuring device mounted on the tip of one of said slider units;

measuring a relative position of the fine wire to the center of said inspection apparatus using said non-contact type two-dimensional position sensor; and determining a radius or a radius deviation of the object to be measured of the inner surface of said cylindrical bore from the relative position of said fine wire to the center of the inspection apparatus mounted on the rise and fall base, the length from the position of said center to a reference position of the tip of said slider unit provided with said distance measuring device, and the measured value of a distance between said tip reference position and the inner surface of said cylindrical bore, which distance is detected by said distance measuring device, all of which are obtained at each of the positioning points.

9. A centering method according to claim 8, wherein the method further comprising;

centering said inspection apparatus mounted on said rise and fall base via a first two-axis feed table mounted on the head base assembly supported by said top portion of said large cylindrical bore;

rotating and index measuring of said inspection apparatus mounted on said rise and fall base using the data of a rotation measuring device of a turn table on said head base assembly;

levelling and measuring of the height of said inspection apparatus mounted on said rise and fall base using the data of a rotation measuring device of a pair of hoisting winches on said head base assembly; and determining a radius or a radius deviation of the object to be measured from the data of said non-contact type two-dimensional position sensor measured the position of the center of said inspection apparatus in relation to said fine wire, the distance from the position of said center to the reference position of the tip of said slider unit, to which said distance measuring device has been attached, which is calculated from the data of a length measuring device for a plurality of stages of highly rigid slide arms which have a rack/pinion assembly constituting said respective manipulator arms and said slider unit, and the data on the measured value of the distance between said tip reference position and the inner surface of said large cylindrical bore which is given by said distance measuring device.

10. A centering method according to claim 8, wherein said non-contact type two-dimensional positional sensor is a laser two-dimensional position sensor and said distance measuring device is a non-contact type laser distance measuring device.

11. A centering method according to claim 9, wherein at least one of said first two-axis feed table, said turn table, and said second two-axis feed table is numerically controlled and said pair of hoisting winches have a motor equipped with a rotation measuring device/brake.

12. A centering method according to claim 9, wherein said data are processed through a device required for converting, displaying and/or recording of said data, a console, and/or a control unit, which are disposed adjacently to said top portion of the large cylindrical bore, via a cable.

13. A centering method according to claim 9, wherein a part or all of said data is received and sent by radio transmission.

14. A centering method according to claim 8, wherein said inspection apparatus supported by said rise and fall base is levelled by measuring the length of a pair of levelling wires which have been pulled out and which are attached to two points of said rise and fall base.

15. A centering method according to claim 8, wherein said inspection apparatus supported by said rise and fall base is levelled by measuring the levelness of said inspection apparatus by using a slant sensor mounted on said inspection apparatus.

16. A centering method wherein:

supporting an inspection apparatus mounted on a rise and fall base which is horizontally supported by a head base assembly supported by a top portion of a large cylindrical bore in such a manner that it is allowed to vertically move in parallel to a fine wire which is hung perpendicularly from the center of said top portion of said large cylindrical bore, and said inspection apparatus having a non-contact type two-dimensional position sensor for detecting the relative position of said fine wire to the center of said inspection apparatus;

positioning said inspection apparatus at an arbitrary height;

extending a pair of manipulator arms installed on said inspection apparatus to a point immediately before an inner surface of said cylindrical bore to be measured and they are positioned at the point, said a pair of manipulator arms being able to be extended or contracted in a lateral direction and symmetrically balanced in gravity;

extending a first slider unit which is fixed on the tip of one of the manipulator arms and capable of being extended or contracted in a lateral direction by a predetermined distance to a point where a vibration isolation contact member attached to the tip of the first slider unit comes in contact with the inner surface of the cylindrical bore and the first slider unit is positioned at that point;

extending a second slider unit which is fixed on the tip of the other manipulator arm and capable of being extended or contracted in a lateral direction by a predetermined distance to a point where a vibration isolation contact member attached to the tip of the first slider unit comes in contact with the inner surface of the cylindrical bore and the second slider unit is positioned at that point extending, with said respective contact members in contact with the inner surface of said large cylindrical bore, an extensible tip capable of being positioned at an arbitrary point and mounted on a contact type extensible measuring probe attached to the tip of the second slider unit beside the vibration isolation contact member until it comes in contact with the object to be measured of the inner surface of the cylindrical bore, and the extensible tip is positioned at that point;

detecting the relative position of said fine wire relative to the center of said inspection apparatus being mounted on the rise and fall base using the non-contact type two-dimensional position sensor supported on said inspection apparatus; and determining a radius or a radius deviation of the object to be measured from the data of said non-contact type two-dimensional position sensor measured the relative position of the center of said inspection apparatus in relation to said fine wire, the distance from the position of said center to the tip reference position of said slider unit provided with said contact type extensible measuring probe, and the measured value of the distance from said tip reference position to said object to be measured which is given by said extensible tip of said contact type extensible measuring probe, all of which are obtained at the positioning points.

17. A centering method according to claim 16, wherein a non-contact type laser distance measuring device is attached to the tip of said second slider unit in place of said contact type extensible measuring probe, and said non-contact type laser distance measuring device measures the distance from said tip reference position to said object to be measured of the inner surface of said large cylindrical bore, with said respective contact members in contact with the inner surface of said large cylindrical bore.

18. A centering method according to claim 16, wherein the method further comprising:

centering said inspection apparatus mounted on said rise and fall base via a first two-axis feed table mounted on a head base assembly supported by said top portion of said large cylindrical bore;

rotating and index measuring of said inspection apparatus mounted on said rise and fall base using the data of a rotation measuring device of a turn table on said head base assembly;

levelling and measuring of the height of said inspection apparatus mounted on said rise and fall base using the data of a rotation measuring device of a pair of hoisting winches on said head base assembly; and determining a radius or a radius deviation of the object to be measured from the data of said non-contact type two-dimensional position sensor which has measured the position of the center of said inspection apparatus in relation to said fine wire;

the distances from the positions of said center to the tip reference positions of said slider units which are determined from the data of each of the length measuring devices for a plurality of stages of highly rigid slide arms which have rack/pinion assemblies constituting said respective manipulator arms and said slider units, and the measured value of a distance between said tip reference position and the inner surface of said cylindrical bore, which distance is detected by said extensible tip of said contact type extensible measuring probe, all of which are obtained at each of the positioning points.

19. A centering method according to claim 16, wherein the contact between the tip of said contact type extensible measuring probe attached to the tip of said second slider unit and said object to be measured is detected by a machine vision apparatus installed on said inspection apparatus.

20. A centering method according to claim 18, wherein at least one of said first two-axis feed table, said turn table, and said second two-axis feed table is numerically controlled and said pair of hoisting winches have a motor equipped with a rotation measuring device/brake.

21. A centering method according to claim 16, wherein said data are processed through a device required for converting, displaying and/or recording of said data, a console, and/or a control unit, which are disposed adjacently to said top portion of the large cylindrical bore, via a cable.

22. A centering method according to claim 16, wherein a part or all of said data is received and sent by radio transmission.

23. A centering method according to claim 16, wherein said inspection apparatus supported by said rise and fall base is levelled by measuring the length of a pair of levelling wires which have been pulled out and which are attached to two points of said rise and fall base.

24. A centering method according to claim 16, wherein said inspection apparatus supported by said rise and fall base is levelled by measuring the leveness of said inspection apparatus by using a slant sensor mounted on said inspection apparatus.

* * * * *